United States Patent Office 3,361,239
Patented Jan. 2, 1968

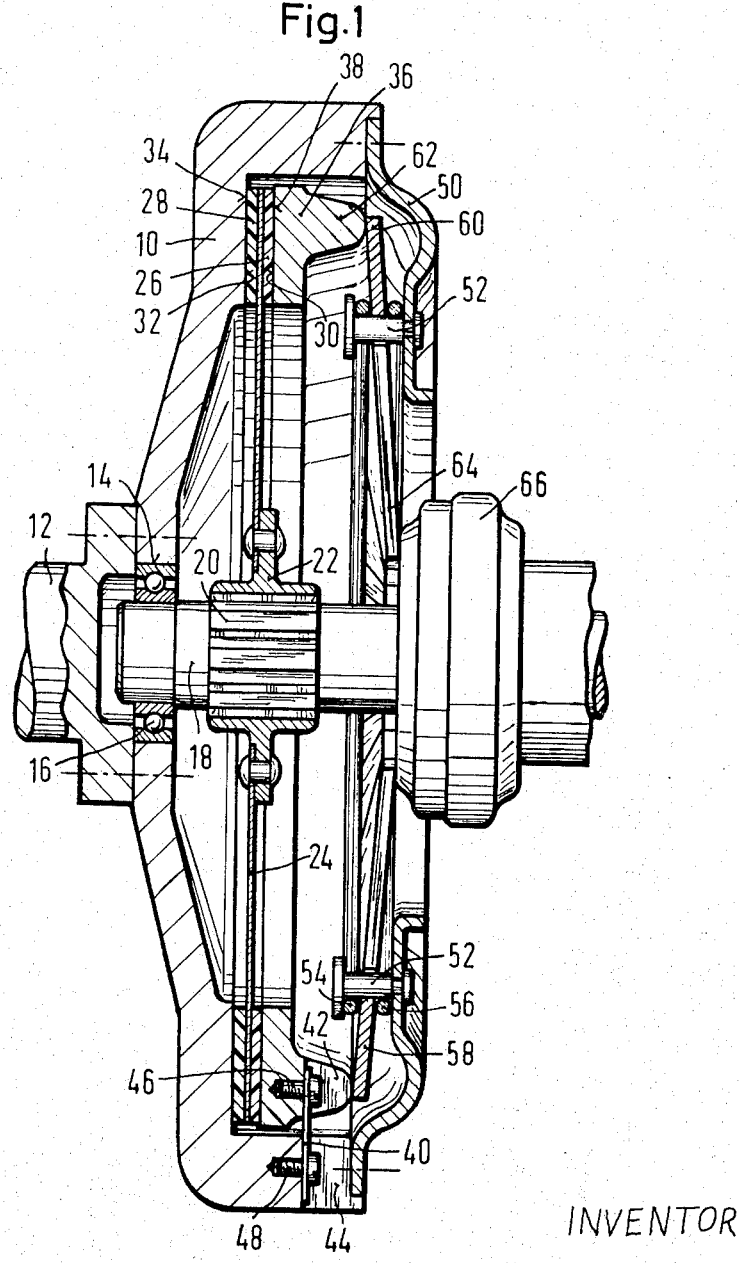

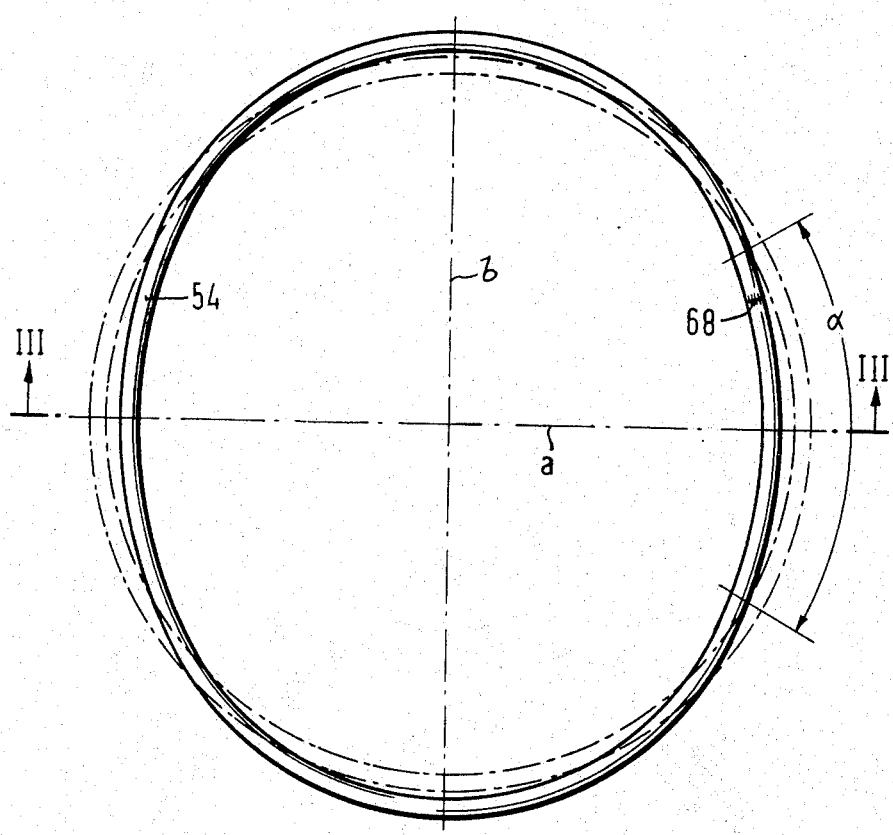

3,361,239
DIAPHRAGM SPRING TYPE CLUTCH WITH IMPROVED PIVOT RINGS
Richard Binder, Schweinfurt, Germany, assignor to Fichtel & Sachs A.G., Schweinfurt, Germany
Filed Feb. 23, 1966, Ser. No. 529,427
Claims priority, application Germany, Feb. 27, 1965, F 45,376
8 Claims. (Cl. 192—89)

This invention relates to clutches employed for connecting the engine of an automotive vehicle with the wheels, and particularly to an improvement in diaphragm spring type clutches.

The diaphragm spring which normally holds the output member of such a clutch in driving engagement with the input member may be pivoted by a release mechanism about a ring coaxial with the input and output members of the known clutch with the improvement of which this invention is concerned, such a clutch being shown, for example, in "Principles of Automotive Vehicles" (Department of the Army Technical Manual TM 9–2700, November 1947, page 256). The pivot ring is held in position on one of the afore-mentioned members of the clutch by means of retaining bolts arranged along a circle about the common axis of the input and output members.

It is known that the afore-mentioned ring is relatively loosely held in the clutch when the latter is engaged and tends to move angularly about the clutch axis under the influence of forces transmitted by an imperfectly balanced engine or due to circumferential oscillations in the clutch caused by other factors. The angular movements of the ring cause wear which reduces the axial thickness of the ring, thereby shifting the pivot of the diaphragm spring in such a manner as to reduce the distance between the driving and driven clutch members in the disengaged clutch. Ultimately, full disengagement of the clutch may become impossible.

Provisions made heretofore for reducing or preventing the angular movements of the pivot ring have not been fully satisfactory. Abutments have been formed on the rings by locally deforming the wire material from which the rings are conventionally made. The abutments limit the angle through which the ring could move by engaging the retaining bolts or the diaphragm spring, but even such small movements have been found to cause serious wear. The deformed wire portions, moreover, have shown relatively early fatigue failure.

An object of the invention is the provision of improved pivot rings for a diaphragm spring type clutch which do not tend to move angularly about the clutch axis.

Another object is the provision of such improved rings which can be made in a very simple and inexpensive manner.

Yet another object is the provision of improved rings which are circumferentially homogeneous in their metallurgical micro-structure except for the unavoidable weld which closes the ring.

With these and other objects in view, the invention provides a pivot ring which consists of resilient material and has a non-circular shape when in the relaxed condition. Abutments of the mounting means employed for coaxially fastening the ring to one of the afore-mentioned clutch members for engagement with the diaphragm spring resiliently deform the ring into an approximately circular shape while it is fastened to the clutch member. The resiliency of the ring itself thereby holds the ring in a fixed position and prevents rotation thereof.

When the clutch is equipped with two pivot rings on opposite axial sides of the spring they may be identically shaped prior to fastening, the relaxed shape preferably being an oval or ellipse whose minor axis is approximately 5 to 10 percent shorter than the diameter of the circular shape assumed by the spring in the mounted condition.

Each ring is preferably made from a single length of wire which is arcuately bent until the two ends can be butt welded. The location of the weld is selected in such a manner that it is within an angle of 30° on either side of the minor axis, the apex of the angle being at the intersection of the minor and major axes. In order to ensure proper contact between the ring and the surfaces engaged thereby, the weld is ground flat on at least one face there of parallel to the plane defined by the axes.

Other features and many of the attendant advantages of this invention will be readily appreciated as the same becomes better understood by reference to the following detailed description of a preferred embodiment when considered with the drawing in which:

FIG. 1 shows a diaphragm spring type clutch of the invention in axial section;

FIG. 2 is an axial view of one of the two identical pivot rings of the clutch of FIG. 1; and FIG. 3 shows the ring of FIG. 2 in section on the line III—III.

Referring now to the drawing in detail, and initially to FIG. 1, there is seen the casing 10 of a clutch which may also serve as the flywheel of a connected engine of which only the terminal portion of the crankshaft 12 is shown, the casing 10 being fixedly attached to the shaft. A central aperture 14 in the casing 10 encloses a pilot bearing 16 in which the free end of the main drive pinion 18 of a transmission, not otherwise shown, is received. Splines 20 on the pinion 18 secure the hub 22 of a clutch disc 24 to the pinion while permitting axial movement of the disc 24.

Annular friction facings 26, 28 on the disc 24 have outer radial surfaces 30, 32 which engage corresponding surfaces 34, 38 of the casing 10 and of a pressure plate 36 in the illustrated engaged condition of the clutch. The pressure plate 36 is attached to the casing 10 by several circumferentially distributed, flexible lugs 40 which permit limited axial movement of the plate 36, only one lug being visible in FIG. 1. Each lug is a narrow leaf spring attached to the bottoms of respective recesses 42, 44 in the pressure plate 36 and the casing 10 by screws 46, 48.

An annular cover 50 fixedly attached to the casing 10 in a conventional manner, not shown, carries pivot ring retaining bolts 52 which are arranged along a circle about the clutch axis, that is, at the same distance from the axis. Two identical pivot rings 54, 56 are held in axially offset positions between the cover 50 and the heads of the bolts 52 in abutting engagement with the radially outer faces of the bolts as will presently be described in more detail. A diaphragm-type spring 58 of conically dished shape is retained between the rings.

The pinion 18 freely passes through a central aperture of the spring 58. Numerous radial slots 64, of which only two are shown, extend from the central aperture of the spring 58 to respective enlarged axial passages through the springs. The bolts 52 are freely movable in associated passages. The outer peripheral portion 60 of the spring 58 is imperforate and abuts against an annular rib 62 on the pressure plate 36 in the illustrated clutch position. A clutch release bearing 66 is axially slidable on the pinion 18. When it moves toward the left, as viewed in FIG. 1, it engages the sectors of the spring 58 between the slots 64 and pivots the spring 58 about the pivot ring 54, thereby releasing the clutch in a manner conventional in itself.

The structure described so far is largely known. This invention is more specifically concerned with the pivot rings 54, 56, and with their cooperation with the retaining bolts 52.

FIG. 2 shows the ring 54 in the relaxed position which the ring assumes prior to installation in the clutch or after release from the same. The ring consists of a single piece of round carbon steel wire, such as wire corresponding to German Industrial Standard DIN 17220 (approximately corresponding to A.I.S.I. type C 1017). The piece of wire is first bent into the circular shape shown in chain-dotted lines and its end portions are connected by a butt weld 68. The circular ring formed is then deformed between the platens of a press or the like until it assumes the approximately elliptical or oval shape shown in fully drawn lines, when in the relaxed condition. The deformation is carried out in such a manner that the weld 68 is located within an angle $\alpha$ of 30° on either side of the minor axis $a$ of the ultimately produced oval shape, as measured from the intersection of the minor axis with the major axis $b$. As best seen in FIG. 3, the weld 68 has two flat faces 70, 72 which are approximately parallel to the plane of the ring, that is, to the plane defined by the intersecting axes $a$ and $b$.

The rings 54, 56 are set into the clutch shown in FIG. 1 in such a manner that the minor axis $a$ extends in the plane of the drawing. The spacing of the retaining bolts 52 is such that the rings are deformed by engagement with the outer abutment faces of the bolts to the circular shape shown in FIG. 2 in chain-dotted lines, and are firmly held to the bolts by their own resiliency, thereby avoiding any tendency to move angularly about the clutch axis when not firmly held between the spring 58 and the heads of the bolts 52 or the cover 50. In the engaged position of the clutch illustrated in FIG. 1, the pivot ring 54 is relatively loosely held between the spring 58 and the head of the bolt 52 while the ring 56 is firmly clamped between the spring and the cover 50. This relationship is reversed when the clutch is disengaged.

Under most conditions of engine operation, the clutch is engaged while the engine is operating. It is therefore usually more important to use a pivot ring of the invention in the position of the ring 54 in FIG. 1, whereas the advantage of slower wear is only secondary in the ring 56. It is more convenient, however, to use two identical pivot rings in a clutch, which employs two such rings and the clutch has been found to operate more quietly when both rings 54, 56 are secured against movement by resilient engagement with the retaining bolts 52. Use of two identical rings also reduces the probability of error in the assembly of the clutch and the number of spare parts to be stocked.

The specific location of the weld 68 shown in FIG. 2 reduces the stresses in the weld during deformation of the ring, and permits the rings closely to approach the desired circular configuration when they are assembled on the retaining bolts 52. Grinding flats 70, 72 on the welds 68 is desirable for better engagement between the rings and the engaged surfaces of the spring 58 and/or the cover 10.

It should be understood, of course, that the foregoing disclosure relates to only a preferred embodiment of the invention, and that it is intended to cover all changes and modifications of the example of the invention herein chosen for the purpose of the disclosure which do not constitute departures from the spirit and scope of the invention set forth in the appended claims.

What is claimed is:
1. In a diaphragm spring type clutch having a driving member and a driven member arranged for rotation about a common axis, a diaphragm type spring, a pivot ring, mounting means coaxially fastening said ring to one of said members for abutting engagement with said spring and a release mechanism for pivoting said spring about said ring between a clutch engaging position in which the spring axially urges said members toward each other and a clutch releasing position, the improvement in the pivot which comprises a pivot ring which is an annular wire member of resilient material having a non-circular shape when in the relaxed condition, said mounting means including abutment means engaging said ring and resiliently deforming the same into an approximately circular shape while fastening the ring to said one member.

2. In a clutch as set forth in claim 1, a second pivot ring, said second pivot ring being an annular wire member of resilient material having a non-circular shape when in the relaxed condition, said mounting means coaxially fastening said second ring to said one member in such a manner that the spring is axially interposed between said rings, the mounting means including abutment means engaging said second ring for resiliently deforming the same into an approximately circular shape while fastening said second ring to said one member.

3. In a clutch as set forth in claim 1, said non-circular shape being approximately oval and having a minor axis and a major axis intersecting said minor axis.

4. In a clutch as set forth in claim 3, said minor axis being approximately 5 to 10 percent shorter than the diameter of said circular shape.

5. In a clutch as set forth in claim 3, said ring including two circumferentially elongated wire portions and a weld connecting said portions, said weld being within an angle of not more than 30° from said minor axis, the angle having its apex at the intersection of said axes.

6. In a clutch as set forth in claim 5, said weld having a flat face substantially parallel to the plane defined by said axes.

7. In a clutch as set forth in claim 1, a second pivot ring substantially identical with said first-mentioned ring, said mounting means including a plurality of retaining bolts arranged on said one member, respective face portions of said bolts defining a circle about said axis, said face portions engaging said rings under the resilient tension of the latter for deforming the same into said approximately circular shape, said rings being axially offset, and said diaphragm type spring being axially interposed between the rings.

8. In a clutch as set forth in claim 7, said rings being approximately oval when in said relaxed condition and each having a minor axis and a major axis intersecting said minor axis, each ring including two circumferentially elongated wire portions and a weld connecting said portions, the weld being angularly spaced from said minor axis not more than 30° relative to the intersection of the axes and having a substantially flat face extending in a plane substantially parallel to the plane defined by said axes.

References Cited
UNITED STATES PATENTS 3,235,049   2/1966   Hufstader _____ 192—89

DONLEY J. STOCKING, *Primary Examiner.*

ARTHUR T. McKEON, *Examiner.*